US011210575B2

(12) United States Patent
Blair

(10) Patent No.: US 11,210,575 B2
(45) Date of Patent: Dec. 28, 2021

(54) EASE OF USE SUPPLY MATRIX FOR IDENTIFICATION OF EQUIPMENT

(71) Applicant: AVERY DENNISON RETAIL INFORMATION SERVICES, LLC, Mentor, OH (US)

(72) Inventor: Jayne Blair, Miamisburg, OH (US)

(73) Assignee: Avery Dennison Retail Information Services, LLC, Mentor, OH (US)

(*) Notice: Subject to any disclaimer, the term of this patent is extended or adjusted under 35 U.S.C. 154(b) by 0 days.

(21) Appl. No.: 16/360,395

(22) Filed: Mar. 21, 2019

(65) Prior Publication Data
US 2019/0294937 A1 Sep. 26, 2019

Related U.S. Application Data

(60) Provisional application No. 62/646,105, filed on Mar. 21, 2018.

(51) Int. Cl.
*G06K 19/06* (2006.01)
*G06K 19/077* (2006.01)
(Continued)

(52) U.S. Cl.
CPC . *G06K 19/06028* (2013.01); *G06K 19/06009* (2013.01); *G06K 19/06037* (2013.01);
(Continued)

(58) Field of Classification Search
CPC ....... G06K 19/06028; G06K 19/07758; G06K 19/06009; G06K 19/07718;
(Continued)

(56) References Cited

U.S. PATENT DOCUMENTS 4,630,384 A * 12/1986 Breen ................. G09F 3/04
24/16 PB
5,838,253 A * 11/1998 Wurz ................. G06K 19/0702
340/10.42
(Continued)

FOREIGN PATENT DOCUMENTS

DE 202016005210 10/2016
DE 202016005210 U1 * 10/2016 ............. G09F 3/206
(Continued)

OTHER PUBLICATIONS

International Search Report and Written Opinion dated Jun. 18, 2019 issued in corresponding IA No. PCT/US2019/023336 filed Mar. 21, 2019.
(Continued)

*Primary Examiner* — Sonji N Johnson

(57) ABSTRACT

An apparatus and method are provided for tagging or labeling an item or equipment for identification and tracking purposes. The apparatus comprises a length of supply material having a first section with a first opening and a second section that may have additional features such as notches or second openings that are configured to engage with the first opening when the second section is pulled through the first opening in the first section. By pulling the second section through the first opening, a loop of material may be formed and applied around an item or product for identification and tracking purposes. Such a tag or label is particularly advantages for use with medical devices and equipment.

22 Claims, 4 Drawing Sheets

(51) Int. Cl.
    *G06K 19/07*    (2006.01)
    *G09F 3/00*     (2006.01)
    *G09F 3/04*     (2006.01)

(52) U.S. Cl.
    CPC ... *G06K 19/0723* (2013.01); *G06K 19/07718* (2013.01); *G06K 19/07758* (2013.01); *G09F 3/0297* (2013.01); *G09F 3/04* (2013.01)

(58) Field of Classification Search
    CPC .......... G06K 19/0723; G06K 19/06037; G09F 3/0297; G09F 3/04
    See application file for complete search history.

(56) References Cited

U.S. PATENT DOCUMENTS

| | | | |
|---|---|---|---|
| 2002/0026738 A1* | 3/2002 | Shiga | G09F 3/0292 40/630 |
| 2007/0146464 A1 | 6/2007 | Shino | |
| 2013/0048711 A1* | 2/2013 | Burns | G06K 1/18 235/375 |

FOREIGN PATENT DOCUMENTS

| | | | | |
|---|---|---|---|---|
| EP | 0595549 A2 * | 5/1994 | ....... | G06K 19/07758 |
| GB | 2228915 | 9/1990 | | |

OTHER PUBLICATIONS

International Preliminary Report on Patentability dated Sep. 22, 2020 issued in corresponding IA No. PCT/US2019/023336 filed Mar. 21, 2019.

* cited by examiner

EASE OF USE SUPPLY MATRIX FOR IDENTIFICATION OF EQUIPMENT

CROSS REFERENCE TO RELATED APPLICATION(S)

The present application claims priority to and the benefit of U.S. Provisional Application No. 62/646,105 filed Mar. 21, 2018, which is incorporated by herein by reference in its entirety.

FIELD OF THE INVENTION

The present invention relates generally to products and methods for tagging or labeling an item or equipment for identification and tracking purposes. More particularly, the present disclosure relates to a length of supply material that is configured to be formed into a loop to tag an item or product. The present invention can be used with medical devices and equipment for identification and tracking purposes.

BACKGROUND OF THE INVENTION

There exists a need in the marketplace to adequately identify and track medical devices through their distribution and use. For instance, the FDA has established and continues to utilize a unique device identification system that seeks to identify medical devices through their distribution and use. When fully implemented, the FDA will require the label of most devices to include a unique device identifier (UDI) in both human- and machine-readable form that must be placed on the device or on another identifier, such as a label and/or tag that is attached to or otherwise associated with the medical device. Likewise, the European Union is in the process of implementing a UDI system, as are most other markets.

In the United States, for example, the FDA requires that each UDI be provided in a plain-text version and in a form that uses automatic identification and data capture (AIDC) technology, which the FDI defines as "any technology that conveys the UDI or the device identifier of a device in a form that can be entered into an electronic patient record or other computer system via an automated process." The UDI itself must be a unique numeric or alphanumeric code that consists of two parts. First, a device identifier (DI), which is a mandatory, fixed portion of the UDI that identifies the labeler and the specific version or model of a device. Second, a production identifier (PI), which is a conditional, variable portion of a UDI that identifies one or more of the following, when included, on the label of a device: the lot or batch number within which a device was manufactured; the serial number of a specific device; the expiration date of a specific device; the date a specific device was manufactured; and distinct identification codes required by law for human cell, tissue, or cellular and tissue-based products regulated as a device. The European Union has defined similar UDI-DI and UDI-PI components of required UDIs.

Accordingly, there exists a need for a product and method that allows for the identification and tracking of items such as medical devices through their distribution and use, particularly a product and method that comply with national and international standards and regulations. The present invention addresses this need by, for example, providing a label or tag for items such as medical devices that contains data fields required by national and international standards and regulations. In particular, the present invention provides for an easy-to-use supply matrix of material for identifying products in order to provide identification and tracking throughout distribution and use of the product. Such easy-to-apply labels and tags are particularly beneficial for use with identification and tracking of medical devices throughout distribution and use thereof.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one aspect, a segment from a supply material is provided with at least one notch that may engage with at least one slit in the segment from the supply of material. In one embodiment, the segment can be removed from the supply of materials to allow an end user to identify medical devices through their distribution and use through the use of a unique device identifier (UDI). The UDI may be provided in human, tactile and/or machine readable form.

A length of supply material may comprise at least one piece of material. The at least one piece of material comprises synthetic fibers, a perimeter, a top face, a bottom face, a first section having a first opening, and a second section having a notch and a second opening, wherein the second section is configured to be pulled through the first opening in the first section until the notch and the second opening engage with the first opening.

In some embodiments, the at least one piece of material is at least partially made of recyclable material, and in some embodiments, the at least one piece of material comprises at least one recycled material.

In some embodiments, the synthetic fibers comprise any one or more of nylon, polyester, flashspun high-density polyethylene fibers, or spandex. In further embodiments, the synthetic fibers comprise a combination of more than one synthetic fiber. In some embodiments, the at least one piece of material further comprises one or more natural fibers, which in some embodiments can be one or more plant fibers or one or more animal fibers.

In some embodiments, the at least one piece of material comprises a woven material. Alternatively, the at least one piece of material comprises a non-woven material.

In some embodiments, the length of supply material further includes optically readable information on the top face of the at least one piece of material, wherein the optically readable information is one or more of a barcode, a QR code, or alphanumeric characters.

In some embodiments, at least one RFID device is placed on the top face of the at least one piece of material. In alternative embodiments, the at least one piece of material comprises more than one layer and at least one RFID device is placed between layers.

The present disclosure further contemplates a method of making an identification tag. The method may comprise providing a length of material having a first section with a first opening, and a second section with a notch and a second opening, printing optically readable information on the length of material, encoding an RFID device located on the length of material, and looping the second section and pulling a bottom edge of the second section through the first opening of the first section to engage the notch and the second opening with the first opening.

In some embodiments, the method comprises providing a length of material that is at least partially made of recyclable materials or comprises one or more recycled material. In some embodiments, the method comprises providing a length of material comprising any one or more of nylon, polyester, flashspun high-density polyethylene fibers, or spandex.

In some embodiments, the method comprises providing a length of material that is a woven material. Alternatively, a length of material that is a non-woven material is provided. Further still, in some embodiments, a length of material comprising one or more natural fibers is provided.

According to some embodiments of the method, the optically readable information includes one or more of a barcode, a QR code, or alphanumeric characters. In some embodiments, printing step and the encoding step are performed in a single process.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
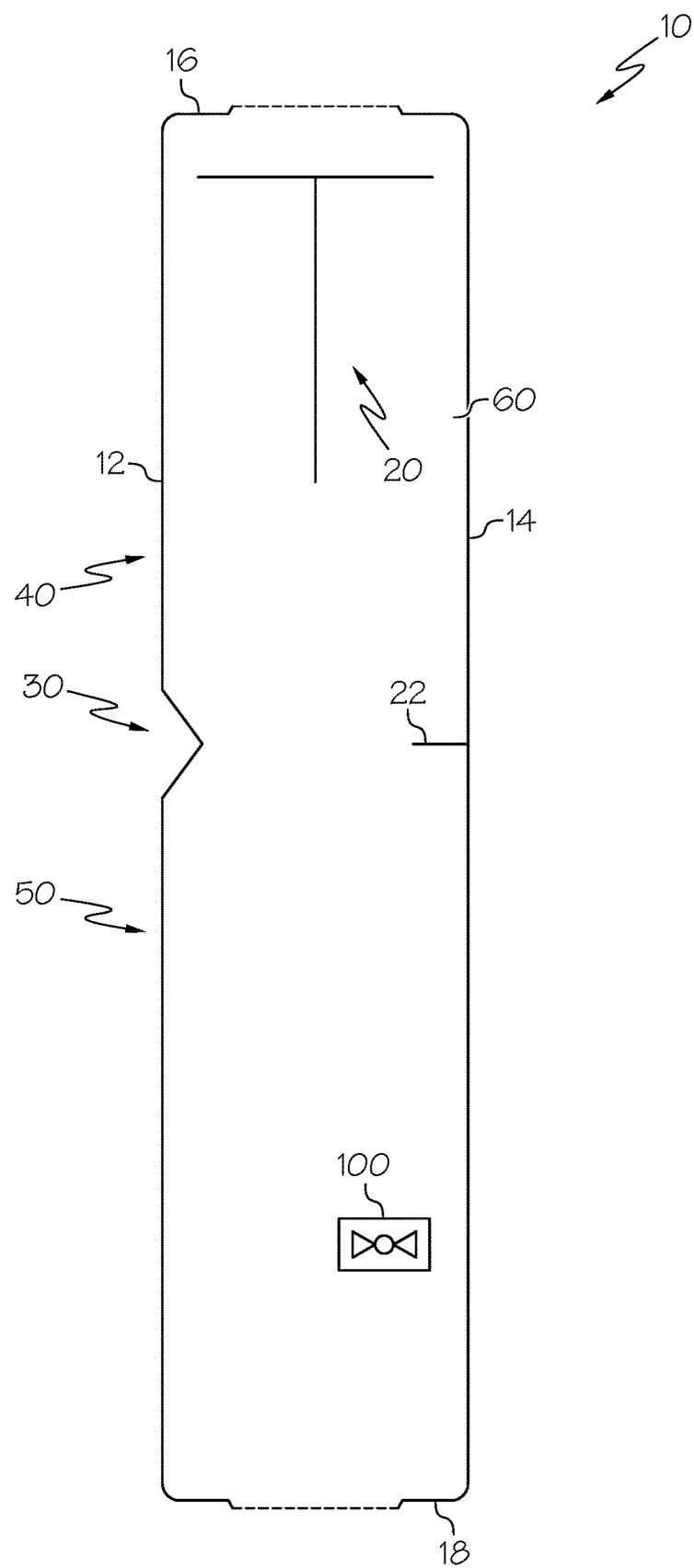
FIG. 1 illustrates a top view of a supply matrix of material contemplated by the present invention.

The product and methods disclosed herein are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials etc. can be made and may be desired for a specific application. In this disclosure, any identification of specific shapes, materials, techniques, arrangement, etc. are either related to a specific example presented or are merely a general description of such a shape, material, technique, arrangement etc. Identifications of specific details or examples are not intended to be, and should not be, construed as mandatory or limiting unless specifically designated as such.

Generally, the present invention relates to a separable segment of material having a particular area and perimeter defined by longitudinally extending sides and transversely extending end edges, such that the segment of material may be used in order to create a combination label and tag. While the label and associated tag are described for use in correlation with medical devices, the present invention is not limited to such use. The segment may be made from any type of suitable material including paper, reinforced cellulosic material, plastic or synthetic material, or combinations thereof. The segment may be either partially or completely made of recyclable material. The segment may be either partially or completely made of post-consumer material. In addition, the segment may be coated or laminated with a protective material. The benefit of using plastic, synthetic, or other reinforced material, is that such constructions can provide the segment with greater durability and resistance to materials like water and other chemicals and/or general wear during use of the segment.

In one embodiment of the present invention, labels and/or tags formed from the segment are made from synthetic fibers such as, but not limited to, nylon, polyester, Tyvek® (i.e., flashspun high-density polyethylene fibers) or spandex. The present disclosure contemplates that the synthetic fibers used to construct the label and/or tag (referred to herein either as "label" or "tag") may be made from a single type of synthetic fiber, or may be made from a combination of more than one synthetic fiber. The label may be made from a woven material comprising one or more synthetic fibers, or may be made from a non-woven material comprising one or more synthetic fibers. The present disclosure also contemplates that the label may be constructed using a combination of one or more synthetic fibers as well as one or more natural-origin fibers. Such natural-origin fibers may include, but are not limited to, plant fibers or animal fibers. Plant fibers may include abaca, coir, cotton, flax, hemp, jute, ramie, and sisal. Animal fibers may include alpaca, angora, camel, cashmere, mohair, wool, and silk. The label may also be constructed using recycled materials such as PET or other plastic materials, polyesters, cellulose materials, or the like.

In one embodiment of the present invention, the label is made of at least two different materials. A first section of the label can be one material or a combination of materials, and a second section of the label can be a second material or a combination of materials. In view of the present embodiment, the first section may comprise approximately 10 percent to approximately 90 percent of the length of the label, as defined from extending from a first end of the label to a second, opposite end of the label, and the second section may comprise the remaining length of the label (i.e., approximately 90 percent to approximately 10 percent). Alternatively, the first section may comprise approximately 25 percent to approximately 75 percent of the length of the label, and the second section may comprise the remaining length of the label (i.e., approximately 75 percent to approximately 25 percent). In a preferred embodiment, the first section comprises approximately 50 percent of the length of the label, and the second section comprises the remaining length of the label (i.e., approximately 50 percent). The present disclosure contemplates that the first and second sections may be any other desired length, as required or specified by a manufacturer or user.

Attention is directed to the Figures. FIG. 1 illustrates one embodiment of a segment or length of a supply material 10 used to form the label of the present invention. Supply material 10 has a left side, defined by a first vertical edge 12, and a right side, defined by a second vertical edge 14. Supply material 10 further has a top end, defined by a top transverse edge 16, and a bottom end, defined by a bottom transverse edge 18.

In one embodiment, at least one slit or cross hatch 20 is made in supply material 10. As shown in FIG. 1, the slit 20 is located in an upper portion or first section 40 of supply material 10, and approximately halfway between the first vertical edge 12 and the second vertical edge 14. A person of ordinary skill in the art will appreciate, however, that the slit 20 is not limited to any particular location in the supply material 10, either horizontally or vertically. Supply material 10 can include any number of slits, each which may include any one or more of the features discussed further herein.

As illustrated in FIG. 1, the slit 20 is in a T-shaped configuration, but it is not limited to such. For example: slit 20 can be a single vertical line (where a vertical direction is defined as the direction running substantially along the length of supply material 10 between the top transverse edge 16 and the bottom transverse edge 18); slit 20 can be a single horizontal line (where a horizontal direction is defined as being perpendicular to the vertical direction); slit 20 can be in an uppercase I-shaped configuration; slit 20 can be in an uppercase H-shaped configuration; slit 20 can be in an upside-down T-shaped configuration (i.e., can include a single vertical line bisecting at a lower end thereof a single horizontal line); slit 20 can be a single diagonal line (i.e., one that extends from an upper left corner portion toward a lower right corner portion, or vice-versa); slit 20 can be two intersecting diagonal lines, such as in an X-shaped configuration or a V-shaped configuration, further where the tip of the "V" formed by the two diagonal lines may be pointing down, up, left, or right; or slit 20 can take any other shape or configuration as desired or required by a manufacturer or user.

Although shown in FIG. 1 as being comprised of two straight lines, slit 20 may be comprised of one or more curved or arced lines, solely or in addition to one or more straight lines. For example, slit 20 may be in a C-shaped configuration, an S-shaped configuration, a U-shaped configuration, a J-shaped configuration, or any other configuration utilizing one or more curved lines alone or in combination with one or more straight lines. Where more than one slit 20 is used, each slit 20 may have the same configuration. Alternatively, any two or more configurations may be used to form a plurality of slits 20 on supply material 10.

Regardless of the particular configuration used for any one or more slits 20, slit 20 may be sized in one or more directions to aid in forming supply material 10 into a loop, as discussed further herein. For example, slit 20 having a vertical line may have a length that is approximately equal to a width of supply material 10. In some embodiments, slit 20 having a vertical line may have a length that is slightly less than a width of supply material 10. For example, a slit 20 may have a length that is up to approximately 25 percent less than a width of supply material 10. In this manner, a slit 20 that has a length that is less than the width of supply material 10 will aid in retaining an end portion of supply material 10 therein when a loop is formed, as discussed further herein. Although a vertical length of slit 20 is generally defined by the corresponding width of supply material 10, in some embodiments slit 20 having a vertical line may be approximately 0.25 inches long to approximately 2 inches long. In some embodiments, slit 20 may be approximately 0.5 inches long to approximately 1.5 inches long. In still other embodiments, slit 20 may be approximately 1-inch long.

As will be apparent to a person of ordinary skill in the art, a horizontal width of slit 20 having one or more horizontal lines, such as slit 20 illustrated in FIG. 1, will be confined by a width of supply material 10. In other words, a horizontal width of slit 20 must be less than the width of supply material 10. For example, a horizontal width of slit 20 may be equal to approximately 25 percent to approximately 90 percent of the width of supply material 10. In some embodiments, a horizontal width of slit 20 may be equal to approximately 40 percent to approximately 75 percent of the width of supply material 10. In still other embodiments, a horizontal width of slit 20 may be equal to approximately 50 percent of the width of supply material 10. Where slit 20 includes more than one horizontal line, such as when an uppercase I-shaped configuration is used, each horizontal line may have the same length. Alternatively, where slit 20 includes more than one horizontal line, each horizontal line may have a different length.

Slit 20 having one or more diagonal lines or one or more curved lines may likewise be sized as desired or required by a manufacturer or user, in particular to aid in retaining a portion of supply material 10 therein to form a loop, as discussed further herein. For example, such slits 20 may have an overall length in a vertical direction and an overall width in a horizontal direction similar to the sizes discussed above. In some embodiments, the overall vertical length and overall horizontal width of slit 20 is equal. In other embodiments, an overall vertical length of slit 20 is greater than an overall horizontal width of slit 20. In still other embodiments, an overall vertical length of slit 20 is less than an overall horizontal width of slit 20.

The slit 20 allows for easy utilization of the supply material 10. For example, slit 20 can allow for simple and quick application of supply material 10 to a medical device by, for example, a medical device manufacturer, distributor, reseller, or any other person who may be in a position to apply supply material 10 to a medical device. Likewise, slit 20 can allow for simple and quick removal of supply material 10 by an end user, such as a doctor or other medical professional that may be using the supply material 10 in cooperation with a medical device.

Supply material 10 may include one or more notches 30. As shown in FIG. 1, notch 30 is located on a first vertical edge 12 of supply material 10. In some embodiments, more than one notch 30 is used. For example, a supply material 10 may have two notches (as shown, for example, in FIGS. 5A and 5B). In such embodiments, one notch 30 may be located on a first vertical edge 12 and a second notch 30 may be located on a second vertical edge 14 of supply material 10, and typically each notch 30 would be located in substantially the same vertical position along each vertical edge 12, 14. In alternative embodiments, on or more notches 30 are included on the same vertical edge.

As a person of ordinary skill in the art will appreciate, notch 30 can be located at different portions along a first or second vertical edge 12, 14 of supply material 10. As shown in FIG. 1, for example, notch 30 is located approximately halfway down first vertical edge 12 (i.e., notch 30 is located approximately halfway between top transverse edge 16 and bottom transverse edge 18). Notch 30 can be located in different locations, however, for example approximately one-quarter of the vertical length below the top transverse edge 16 or one-quarter of the vertical length above the bottom transverse edge 18. A notch 30 can be located at any other suitable location along a vertical length of supply material 10 without departing from the scope of the present disclosure. Typically, notch 30 (or all notches in embodiments utilizing more than one notch 30) is located below slit 20. As discussed further herein, locating notch 30 below slit 20 provides retention means for retaining a portion of supply material 10 in slit 20 to form opening 53, as discussed further herein.

In embodiments including more than one notch 30 located on the same vertical edge, the notches are typically grouped together. In this manner, the size of an opening 53 created when supply material 10 is formed into a loop, as discussed further herein, can be adjusted as may be necessary to accommodate different sizes of medical devices to which supply material 10 is applied.

Notch 30 may take many different forms or shapes, as contemplated by the present disclosure. As shown in FIG. 1, notch 30 is formed in supply material 10 in a generally triangular shape. As illustrated, a vertex of the triangle points in toward a center of the supply material 10, away from the first vertical edge 12. Notch 30 can be any other suitable shape, however, such as a square, a rectangle, a circle or portion thereof, or any other geometric configuration that will provide the benefits of notch 30 discussed further herein.

It is also within the scope of the present disclosure for notch 30 to take many different sizes. For example, notch 30 may extend approximately 5 percent to approximately 25 percent across the width of supply material 10 (i.e., from either first vertical edge 12 or second vertical edge 14 to an opposite vertical edge 12, 14). In some embodiments, notch 30 extends approximately 10 percent to approximately 20 percent across the width of supply material 10. In still further embodiments, notch 30 extends approximately 15 percent across the width of supply material 10. Likewise, an outer edge of notch 30 may extend along various lengths of a vertical edge 12, 14 of supply material 10. For example, notch 30 may extend along approximately 3 percent to approximately 13 percent of a vertical edge 12, 14 of supply material 10. In some embodiments, notch 30 may extend along approximately 5 percent to approximately 10 percent of a vertical edge 12, 14 of supply material 10. In some embodiments, notch 30 may extend along approximately 6 percent to approximately 7 percent of a vertical edge 12, 14 of supply material 10.

As discussed herein, supply material 10 may include more than one notch 30. In such embodiments, two or more such notches 30 may have the same size and/or the same shape. In some embodiments, two or more notches 30 may have a different size and/or shape.

Optionally, a second slit 22 is located on an opposing vertical edge from notch 30. As shown in FIG. 1, for example, notch 30 is located on first vertical edge 12 and second slit 22 is located on second vertical edge 14, where notch 30 and second slit 22 are located in substantially the same vertical position along each vertical edge 12, 14. Notch 30 and second slit 22 can aid in retaining a portion of supply material 10 in slit 20 when supply material 10 is looped to create a tag 80, as discussed further herein. In some embodiments, supply material 10 includes more than one second slit 22. In embodiments where supply material 10 further includes more than one notch 30, each second slit 22 may be located opposite a corresponding notch 30, however such configuration is not required by the present disclosure.

It is within the scope of the present disclosure for second slit 22 to vary in size. For example, second slit 22 may extend approximately 5 percent to approximately 25 percent across the width of supply material 10 (i.e., from either first vertical edge 12 or second vertical edge 14 to an opposite vertical edge 12, 14). In some embodiments, second slit 22 extends approximately 10 percent to approximately 20 percent across the width of supply material 10. In still further embodiments, second slit 22 extends approximately 15 percent across the width of supply material 10. As discussed herein, supply material 10 may include more than one second slit 22. In such embodiments, two or more second slits 22 may have the same size and, in some embodiments, two or more second slits 22 may have a different size.

Figure 2A:
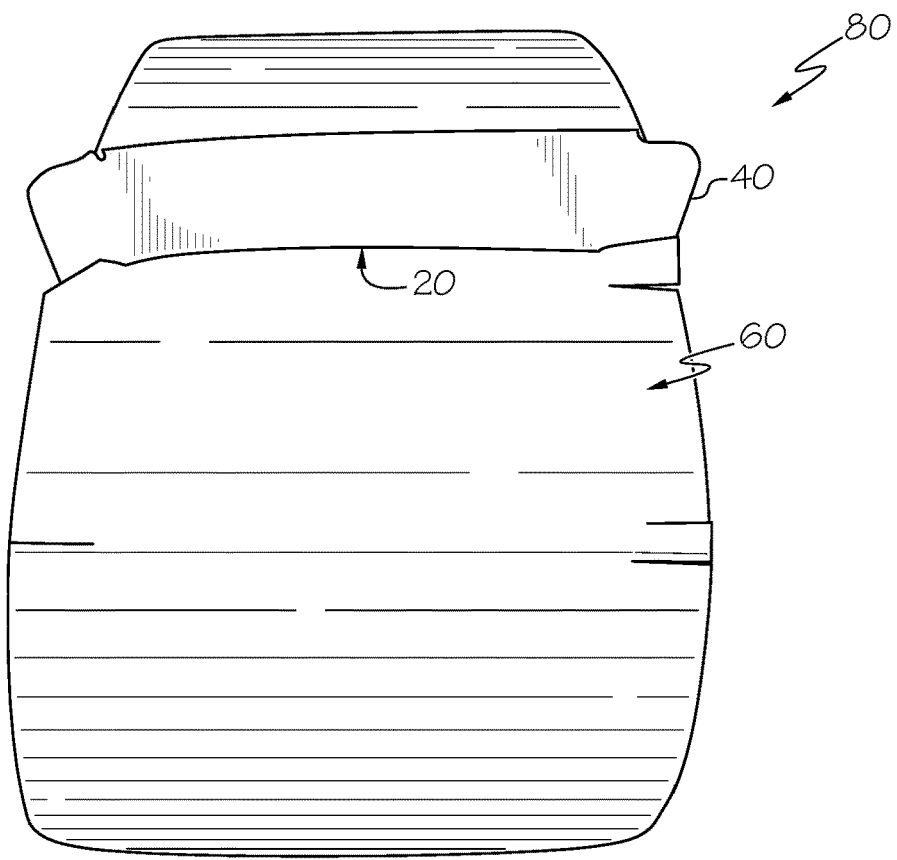
FIG. 2A and FIG. 2B illustrate the supply matrix of material illustrated in FIG. 1, shown in a loop form for attachment to an item.
Figure 2B:
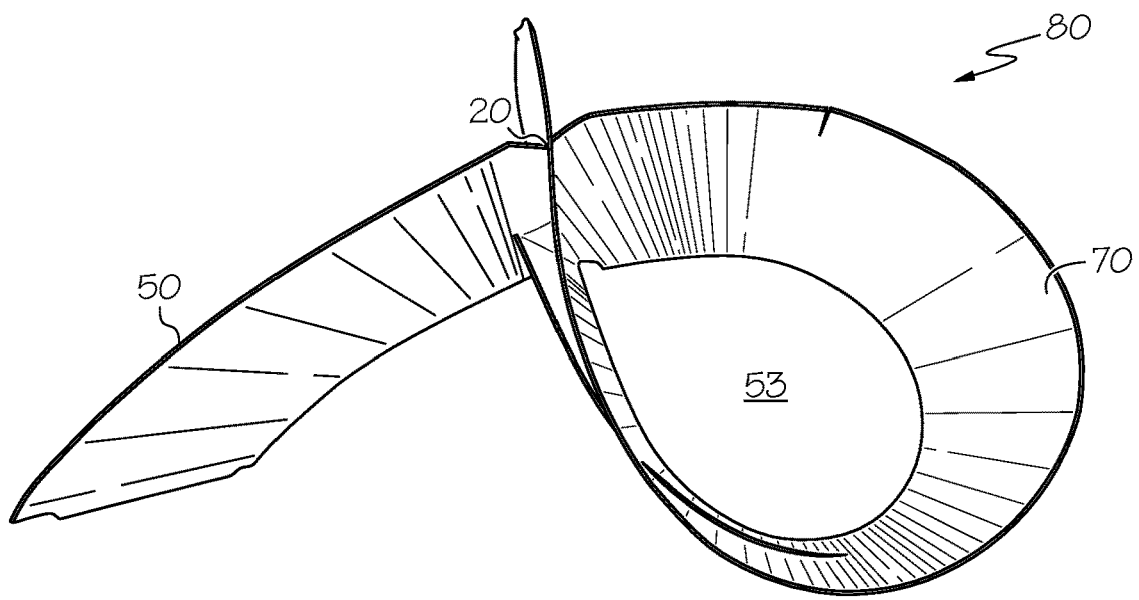

The present disclosure further contemplates forming a tag 80 for application to items and products, such as medical devices, for identification and tracking purposes. For example, a second section 50 of supply material 10 can be inserted and pulled through a slit 20 located in a first section 40 of supply material 10. Inserting second section 50 through slit 20 creates opening 53 to form tag 80, as shown in FIGS. 2A and 2B. With the embodiment shown in FIG. 1, for example, the second section 50 is pulled through the slit 20 until the notch 30 and the second slit 22 are engaged with the slit 20. This is best illustrated in FIG. 2B, which illustrates the second section 50 pulled through the slit 20. The notch 30 aids in pulling the second section 50 through the slit 20. An opening 53 is created by pulling the second section 50 through the slit 20 to form tag 80. Opening 53 is where tag 80 can be attached to an item for identification and tracking purposes, such as a medical device.

Features described herein, such as one or more notches 30 and/or second slits 22 can engage with slit 20 to further aid in retaining supply material 10 in a loop formation. For example, as illustrated in FIGS. 2A and 2B, slit 20 engages with notch 30 and second slit 22 to create a tag 80 that allows a user to place the printed tag 80 over an item or product, such as a medical device, which can include, for example, an endoscope. The tag 80 of the present disclosure can be used with any type of item or product, such as a medical device, for identification and tracking purposes, and may be modified as necessary to appropriately accommodate the item or product in each instances. The at least one notch 30 and second section 50 engage with slit 20 in first section 40 to provide a secure connection when folded over, thus providing a secure connection when engaged with an item or product, such as a medical device or piece of medical equipment.

According to some embodiments, supply material 10 has an adhesive layer (not illustrated) adhered to at least a portion of a bottom face 70. In such embodiments, a release liner (not illustrated) is adhered to the adhesive layer. The adhesive layer may comprise any suitable adhesive, such as a pressure sensitive adhesive, repositionable adhesive, or other controllable type of adhesive. The adhesive may be applied in a particular pattern, or it may be full coated or provided in sections.

Figure 3:
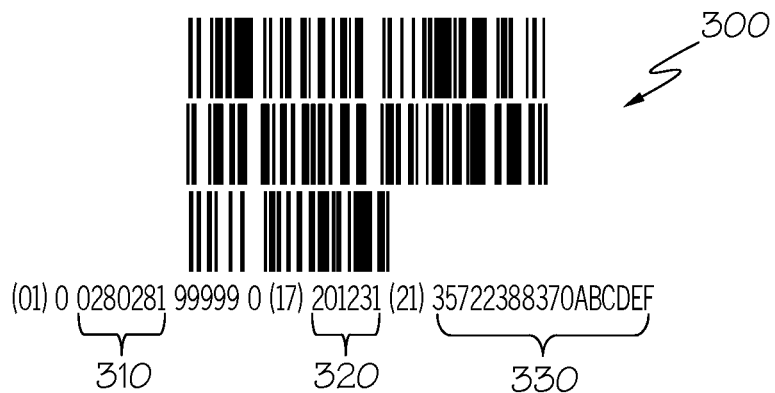
FIG. 3 illustrates one form of a UDI that complies with national and international regulations and standards.

The tag 80 contemplated by the present disclosure enables critical information to be printed on a portion of supply material 10 in human-readable and/or machine-readable (e.g., encoded in an appropriate barcode, such as a data matrix) in accordance with the Unique Device Identification Standards. The relevant information stored in a barcode symbol, for example as illustrated in the UDI label 300 shown in FIG. 3, includes the global trade item number 310, expiration date 320 and serial number 330 identifying the unique device or piece of equipment. UDI label 300 may include any additional required or optional information to comply with national and/or international regulations and standards. For example, UDI label 300 may include information on the medical device labeler, the specific version or model of the device, the lot or batch number, the date the device was manufactured, and distinct identification codes required by law for human cell, tissue, or cellular and tissue-based products regulated as a device.

Figure 5A:
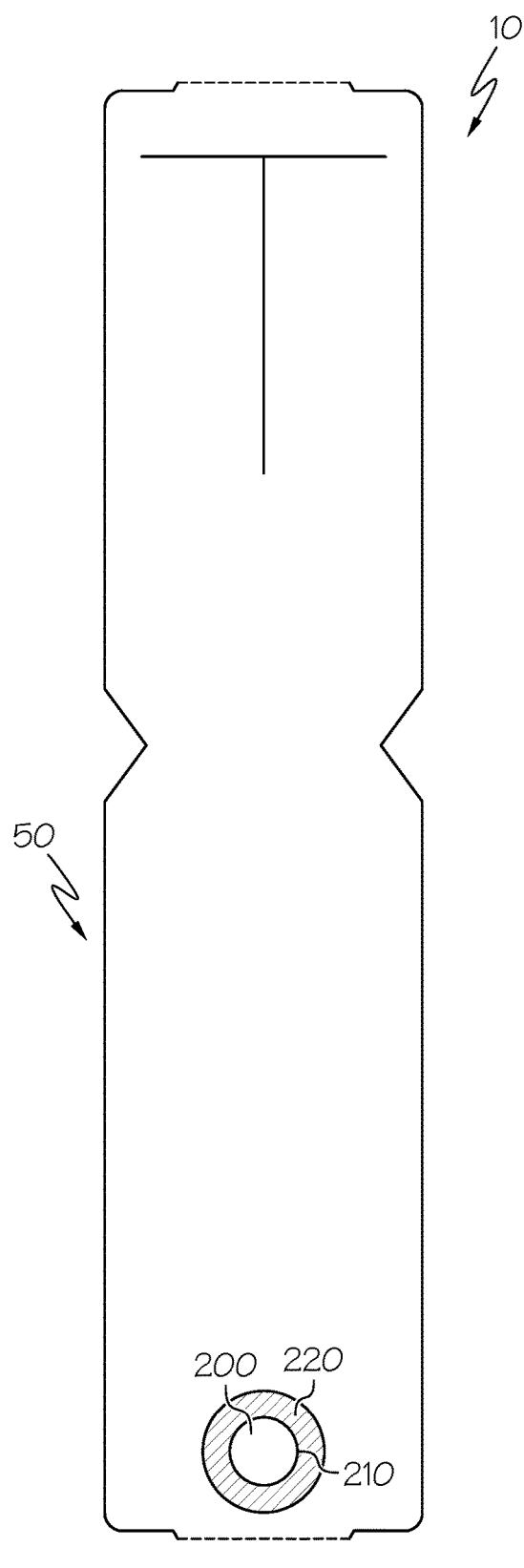
FIG. 5A illustrates a top view of a supply matrix of material having a hole contemplated by the present invention.

Attention is now directed to FIG. 5A. As illustrated in another construction of the present invention, the second section 50 of the supply material 10 may contain a hole 200. The hole 200 in the supply material 10 will allow a user to add additional tags that may contain additional identifiable information. The tags may have additional identification information—including a patient's name, address, phone number, allergy information, and the like. Additionally, or alternatively, the tags may have other additional information, such as a doctor's or other health care provider's name, office name, address, phone number, and the like. In some embodiments, the inner edge 210 of the hole 200 may contain additional material 220 to prevent tearing. The additional material may be one of lamination or any other protective coating or reinforcement, and may include a plastic or other synthetic materials.

In one embodiment presently contemplated, one or more radio frequency identification (RFID) devices 100 may be utilized as opposed to a barcode symbol, or in correlation with a barcode symbol, in order to identify and track an item, such as a medical device, as it is distributed and throughout the item's utilization. The information used to identify, for example, a medical device and track its course through utilization may be stored in the chip of the RFID device 100. The RFID device 100, when used, may be read by a mobile communication device or any other reader known to those of ordinary skill in the art.

The RFID device 100 may be placed anywhere on a top face 60 or bottom face 70 of supply material 10. Alternatively, supply material 10 may comprise two or more layers and any RFID device(s) 100 may be placed between adjacent layers. Ideally, RFID device 100 is located on supply material 10 such that performance of RFID device 100 will not be affected. For example, bending or folding supply material 10 in a manner that could result in breakage of RFID device 100 would render RFID device 100 inoperable. Thus, it may be beneficial to locate RFID device 100 on a portion of supply material 10 that will not be bent or folded. As illustrated in FIG. 1, RFID device 100 is placed on top face 60 in second section 50. When supply material 10 is looped to form tag 80, second section 50 remains substantially planar and is therefore an appropriate location at which RFID device 100 can be placed. RFID device 100 can be placed along other portions of supply material 10, however, including along portions that will be looped to form opening 53 and generally will not interfere with or affect performance of RFID device 100.

Any sort of human- or machine-identifiable information (e.g., bar code, RFID device, optically readable indicia, such as alphanumeric characters) may be placed on supply material 10. For example, a UDI label 300 such as the embodiment shown in FIG. 3 can be placed on supply material 10. In some embodiments, such information is placed on the second portion 50 that is pulled through the slit 20. Placing such information on the second portion 50 may assist in reviewing the information contained on tag 80 because second portion 50 may remain substantially planar. When tag 80 is applied to an item, such as a medical device, because supply material 10 is looped to form opening 53, any information contained on the looped portion may be more difficult to read or identify. For example, a user may have to rotate tag 80 in order to view all of the information contained thereon. Moreover, certain devices, such as barcode readers, may have difficulty or otherwise be incapable of reading barcodes that are looped or wrapped around a medical device. Human- or machine-readable information related to the item to be identified and tracked can be placed anywhere along the length of tag 80, however.

In some embodiments, one or more QR codes may be utilized as opposed to a RFID device 100 or barcode symbol, or in correlation with either one or more of an RFID device 100 or a barcode symbol, in order to identify devices, such as medical devices, as they are distributed and throughout the device's utilization. The information used to identify, for example, a medical device, and track its course through utilization may be stored in the QR code. The QR code may be read by a mobile communication device or any other reader contemplated by the present disclosure. The QR code may be placed anywhere on a top face 60 or bottom face 70 of supply material 10 that will be visible when tag 80 is applied to an item or product, such as a medical device. Thus, any portion of top face 60 is generally an appropriate location on which to place QR code. Placement of QR code on bottom face 70 of supply material 10 may, however, be more limited because when tag 80 is applied to an item or product, portions of the bottom face 70 that are wrapped around the item or product canned be viewed and thus cannot be scanned by a QR code reader. A bottom face 70 of the second section 50, however, will generally remain visible even when tag 80 has been applied to an item or product. Alternatively, supply material 10 may comprise two or more layers and any QR code(s) may be placed between adjacent layers, where any one or more layers placed above the QR code have a low enough opacity to permit a device to scan the QR code according to techniques known in the art.

Figure 5B:
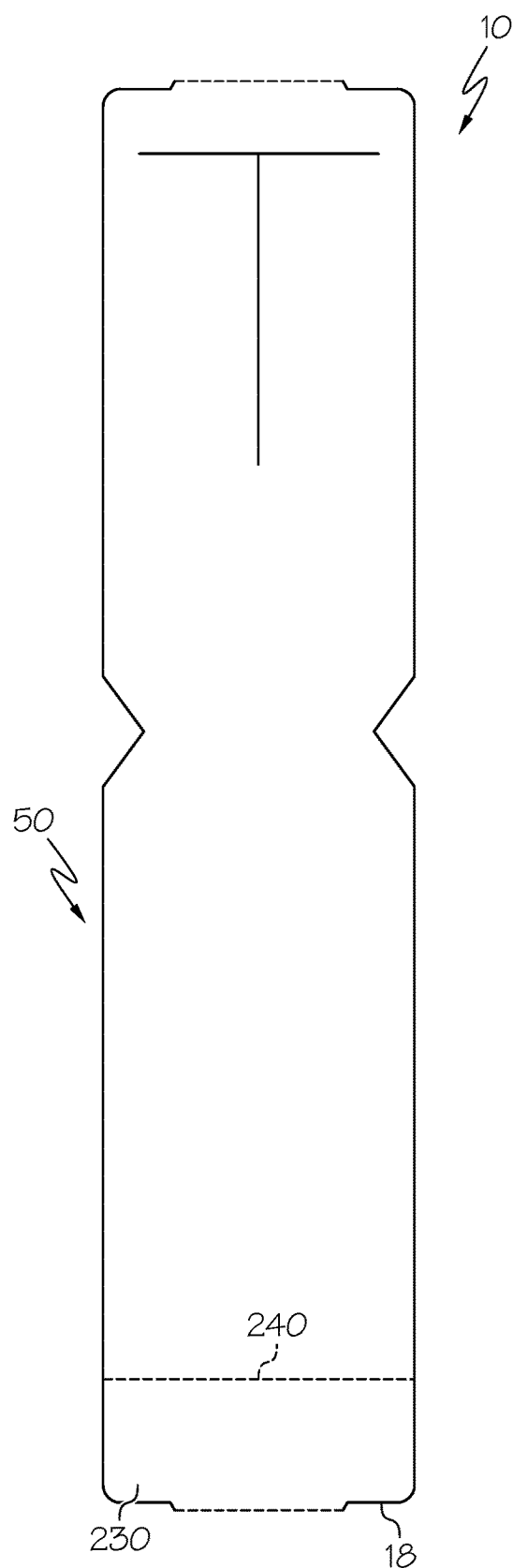
FIG. 5B illustrates a top view of a supply matrix of material having perforations contemplated by the present invention.

Attention is drawn to FIG. 5B. In yet another embodiment of the present invention, the supply material 10 may have a perforated tip 230. The perforated tip 230 may be at an end of the second section 50 near a bottom transverse edge 18. The perforated tip 230 may contain information. For example, the information contained on perforated tip 230 may be any sort of information, including, but not limited to information about the item (such as the item or device to which the label is applied), patient information (e.g., a patient's name, address, phone number, allergy information, and the like), or medical care provider information (e.g., a doctor's or other health care provider's name, office name, address, phone number, and the like). In various embodiments, information may be contained on the perforated tip 230 in any suitable manner. For example, information may be contained in any one or more of printed indicia, a bar code, a RFID device, a QR code, or the like. The perforation 240 of the perforated tip 230 permits easy separation of the perforated tip 230 from the rest of the supply material 10.

In some embodiments, information contained on the perforated tip 230 is duplicative of information contained elsewhere on supply material 10. For example, a duplicate UDI label, as discussed elsewhere herein, may be contained on the perforated tip 230. By including duplicative or redundant information on the perforated tip 230, a labeler (such as a medical device labeler), medical care provider, or other user of the tagged item can remove the perforated tip 230 as may be beneficial for record keeping or other purposes. Alternatively, information contained on the perforated tip 230 may be different or additional to information contained elsewhere on supply material 10. In such embodiments, a labeler (such as a medical device labeler), medical care provider, or other user of the tagged item can remove the perforated tip 230 for record keeping and other purposes. For example, information contained on the perforated tip 230 may allow a person who has removed the perforated tip 230 to use it in a similar manner as, for example, a price tag may be used. Additionally, or alternatively, where patient information or medical care provider information is contained on perforated tip 230, a person who has removed the perforated tip 230 may retain it so that the patient or medical care provider can easily be contacted in the future should the need arise (such as in the event of a product recall).

Figure 4:
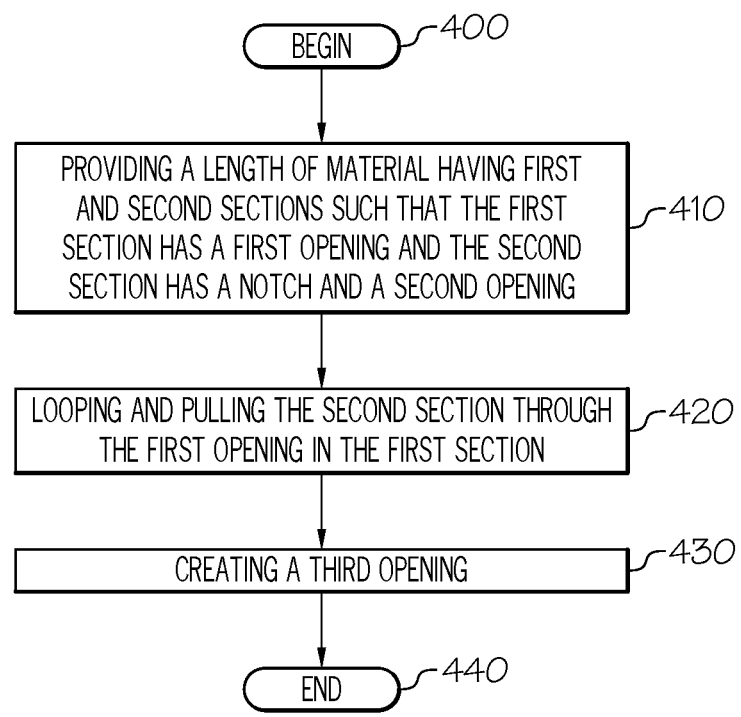
FIG. 4 illustrates a block diagram setting forth a method of making a supply matrix of material.

The present disclosure also contemplates a method of making an identification tag for a device, such as a medical device. For example, a flow diagram showing one embodiment of a method contemplated by the present disclosure is illustrated in FIG. 4. First, to begin the method 400, in step 410, a length of material is provided. In one embodiment, the length of material is constructed out of at least one synthetic fiber. The present disclosure contemplates that the material may be constructed out of at least one natural fiber and/or a combination of synthetic and natural fibers. In some embodiments, the material has a first section and a second section. The first section, in one embodiment, has a first opening. The first opening may comprise a slit. In some embodiments, the first slit may be T-shaped. As discussed elsewhere herein, the first opening may be any number of suitable shapes. In some embodiments, the second section has at least one notch, and at least a second opening, such as a second slit.

Secondly, in step 420, the second section is folded over and looped through the first opening in the first section. The second section should be folded so that any optically readable information contained on the length of material will remain visible. In other words, second section should not be folded so that optically readable information is contained inside of the fold. Moreover, second section is pulled through the first opening until the at least one notch and the at least one second opening engage with the first opening. In embodiments where the second section includes two or more notches and/or two or more second openings, the second section is pulled through the first opening until an appropriate notch and/or second opening engages with the first opening to provide a loop sized to accommodate the item or device to which the tag is applied. In this manner, the loop formed by pulling the second section through the first opening can be adjusted to be either bigger or smaller, as may be required for application of the tag to a particular item or product, such as a medical device.

Thirdly, in step 430, a third opening is created as a result of pulling the second portion through the first opening in the first portion, as described above with respect to step 420. Third opening allows for attachment of the tag to an object such as a medical device. For example, at step 430, third opening may be looped around a portion or component of a medical device or packaging associate therewith as permitted by national and international regulations and standards. After third opening has been attached around an object for identification and tracking, the method may end, in one embodiment, at 440.

Supply material 10 can be produced and provided in roll-to-roll form. Perforations are included along at least a portion of top transverse edge 16 and at least a portion of bottom transverse edge 18. Adjacent lengths of supply material 10 are joined together at these perforations. Individual lengths of supply material 10 for creating tags 80 are torn from an adjacent length of supply material 10 to be applied to an item, such as a medical device, according to the methods disclosed herein.

A roll of adjoining supply material 10 lengths can be run through a printer or other suitable device to impart optical human- and machine-readable information on supply material 10, such as alphanumeric characters, barcodes, QR codes, and the like. When one or more RFID devices 100 are included in supply material 10, RFID devices 100 may be encoded by encoding machines and methods as are known in the art. In some embodiments, RFID devices 100 are encoded during a printing process for printing optically readable information on supply material 10. Alternatively, RFID devices 100 contained on supply material 10 may be encoded before any optically readable information is printed thereon, or after optically printed information is printed thereon. A person of ordinary skill in the art will understand various processes for printing optically readable information and encoding RFID devices 100 on supply material 10.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art. The variations of the embodiments and modes of operation described above may be combined to illustrate additional embodiments. Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A length of supply material comprising:
   at least one piece of material comprising synthetic fibers, a perimeter, a top face, a bottom face, a first edge, a second edge, a first section having a first opening and a second section having a notch in the first edge and a second opening comprising a slit in the second edge,
   wherein the second section is configured to be pulled through the first opening in the first section until the notch and the second opening engage with the first opening, and
   wherein the first opening is formed as a pair of intersecting slits.

2. The length of supply material of claim 1, wherein the at least one piece of material is at least partially made of recyclable material.

3. The length of supply material of claim 1, wherein the synthetic fibers comprise any one or more of nylon, polyester, flashspun high-density polyethylene fibers, or spandex.

4. The length of supply material of claim 1, wherein the synthetic fibers comprise a combination of more than one synthetic fiber.

5. The length of supply material of claim 1, wherein the at least one piece of material comprises a woven material.

6. The length of supply material of claim 1, wherein the at least one piece of material comprises a non-woven material.

7. The length of supply material of claim 1, wherein the at least one piece of material further comprises one or more natural fibers.

8. The length of supply material of claim 7, wherein the one or more natural fibers can be one or more plant fibers or one or more animal fibers.

9. The length of supply material of claim 1, wherein the at least one piece of material comprises at least one recycled material.

10. The length of supply material of claim 1, wherein optically readable information is contained on the top face of the at least one piece of material, wherein the optically readable information is one or more of a barcode, a QR code, or alphanumeric characters.

11. The length of supply material of claim 1, wherein at least one RFID device is placed on the top face of the at least one piece of material.

12. The length of supply material of claim 1, wherein the at least one piece of material comprises more than one layer and at least one RFID device is placed between layers.

13. The length of supply material of claim 1, wherein the pair of intersecting slits form an X shape.

14. The length of supply material of claim 13, wherein the pair of intersecting slits form a T shape.

15. A method of making an identification tag comprising:
providing a length of material having a first edge, a second edge, a first section with a first opening, and a second section with a notch in the first edge and a second opening comprising a slit formed in the second edge;
printing optically readable information on the length of material;
encoding an RFID device located on the length of material; and
looping the second section and pulling a bottom edge of the second section through the first opening of the first section to engage the notch and the second opening with the first opening,
wherein the first opening is formed as a pair of intersecting slits.

16. The method of claim 15, wherein the length of material is at least partially made of recyclable materials or comprises one or more recycled material.

17. The method of claim 15, wherein the length of material comprises any one or more of nylon, polyester, flashspun high-density polyethylene fibers, or spandex.

18. The method of claim 15, wherein the length of material comprises a woven material.

19. The method of claim 15, wherein the length of material comprises a non-woven material.

20. The method of claim 15, wherein the length of material comprises one or more natural fibers.

21. The method of claim 15, wherein the optically readable information includes one or more of a barcode, a QR code, or alphanumeric characters.

22. The method of claim 15, wherein the printing step and the encoding step are performed in a single process.

\* \* \* \* \*